United States Patent [19]
Berney

[11] 3,778,998
[45] Dec. 18, 1973

[54] VARIABLE CAPACITOR FOR ADJUSTING THE FREQUENCY OF A QUARTZ-CRYSTAL CLOCK

[75] Inventor: Jean-Claude Berney, Lausanne, Switzerland

[73] Assignee: Bernard Golay S.A., Lausanne, Switzerland

[22] Filed: May 2, 1972

[21] Appl. No.: 249,495

[30] Foreign Application Priority Data
May 14, 1971 Switzerland.......................... 7083/71

[52] U.S. Cl. .............................. 58/23 AO, 331/179
[51] Int. Cl. .............................................. G04c 3/00
[58] Field of Search ............ 58/23 A, 23 AO, 23 R, 58/34, 50 R, 85.5; 331/177, 179

[56] References Cited
UNITED STATES PATENTS
3,282,042  11/1966  Schaller............................. 58/23 V
3,608,301  4/1970  Loewengart........................ 58/23 A
3,349,350  10/1967  Rittenbach...................... 331/179 X OTHER PUBLICATIONS
Hamilton Watch Co. Timely Topics, May 6, 1970.

*Primary Examiner*—Stephen J. Tomsky
*Assistant Examiner*—Edith Simmons Jackmon
*Attorney*—Eric H. Waters et al.

[57] ABSTRACT

A variable capacitor for adjusting the frequency of a quartz-crystal clock, including a plurality of fixed capacitors of predetermined capacitances tapped in series, conductive elements connected to the poles of each of the fixed capacitors, and a plurality of movable blades adapted to provide for short-circuiting of each of the fixed capacitors across the conductive elements independently of the other capacitors so as to facilitate equi-incremental step variations of the quartz oscillation frequency.

5 Claims, 2 Drawing Figures

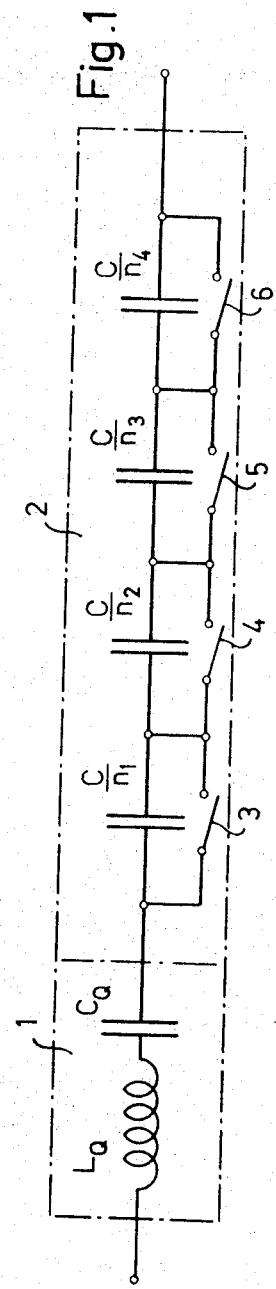
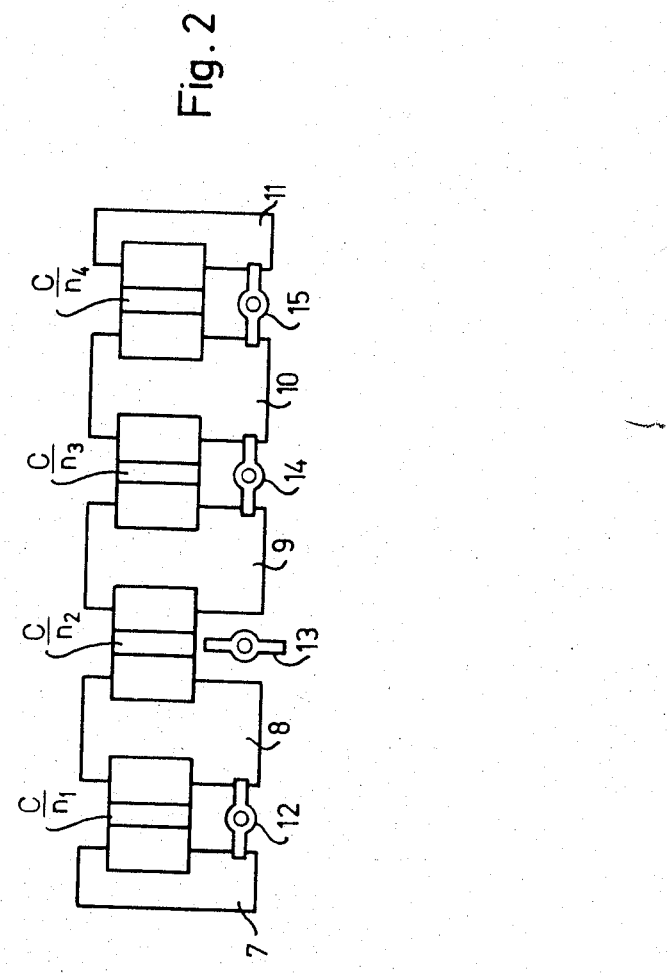

VARIABLE CAPACITOR FOR ADJUSTING THE FREQUENCY OF A QUARTZ-CRYSTAL CLOCK

FIELD OF THE INVENTION

This invention relates to variable capacitors and, more particularly, to a variable capacitor for adjusting the frequency of a quartz-crystal clock.

THE PRIOR ART

Generally, in order to adjust the frequency of a piezoelectric oscillator, a variable capacitor is introduced into its electrical supply circuit. This method of adjusting the frequency is satisfactory upon availability of adequate space.

Problems are encountered in providing frequency adjustments for a quartz-crystal clock, since such a clock requires an extensive range of adjustment, in effect, provided for by a capacitor varying over a large range of capacitance, while, furthermore, any available volume is extremely restricted. Consequently, conventional variable capacitors do not satisfy the conditions for providing a satisfactory solution to the foregoing problems.

Variable capacitors are known which are essentially constituted of several fixed capacitors operating in conjunction with means which facilitate their parallel connection, the capacitors providing capacitances sets of total values at substantially equal increments or steps may be obtained by the parallel connections in accordance with various possible operative combinations. However, these variable capacitors do not permit the obtaining of equi-incremental step variations of the quartz oscillation frequency. As a result, it becomes necessary to augment such capacitor with an auxiliary fixed capacity which is series- or parallel-connected in the electrical supply circuit, to provide for compensating of the inherent quartz frequency disperson.

SUMMARY OF THE INVENTION

In order to obviate the disadvantages encountered in the prior art, of particular use would be a variable capacitor covering the inherent quartz frequency dispersion of the quartz-crystal clock, in effect, approximately $\pm 3 \times 10^{-5}$, while enabling variation of its oscillation frequency in increments or steps having equal values over the full frequency range and incorporating a minimum number of capacitors.

Accordingly, it is an object of the present invention to provide the desired frequency adjustment by the utilization of a variable capacitor constituted of several fixed capacitances tapped in series, their values being respectively equal to $C/n_1$, $C/n_2$ ... $C/n_x$, where $n_1$, $n_2$ ... $n_x$ are whole numbers or integers, and means being provided to facilitate the short-circuiting of each capacitance independently of the others, thereby permitting quartz oscillation frequencies to be obtained which are substantially multiples of a value $\Delta f$, which value corresponds to the frequency variation obtained by positioning a capacity $C$ in the electrical supply circuit.

BRIEF DESCRIPTION OF THE DRAWING

In order to obtain a better understanding of the invention, reference may now be had to the accompanying drawing of a variable capacitor made in accordance with the invention, in which:

FIG. 1 is a schematic diagram of the variable capacitor according to the invention; and FIG. 2 illustrates a specific embodiment of the variable capacitor shown in FIG. 1.

DETAILED DESCRIPTION

In FIG. 1, chain-dotted block 1 represents an inductance $L_Q$ and capacitance $C_Q$ of a quartz osxillator, and chain-dotted block 2 represnets a variable capacitor. The capacitor includes four capacitances $C/n_1$, $C/n_2$, $C/n_3$, $C/n_4$ connected in series ($n_1$ through $n_4$ being integers or whole numbers), and four switches 3, 4, 5 and 6 enabling each capacitance to be respectively short-circuited independently of the other capacitances.

When all of the capacitances are short-circuited, the quartz-crystal oscillates at its own resonance frequency, given by $$\omega_o L_Q - 1/\omega_o C_Q = 0$$

whence $$\omega_o^2 = 1/L_Q C_Q$$

The frequency variation $\Delta f$ obtained in that case is derived from the following equations:

$(\omega_o + \Delta\omega)L_Q - 1/(\omega_o + \Delta\omega)C_Q - n_1/(\omega_o + \Delta\omega)C - n_2/(\omega_o + \Delta\omega)C$
$- n_3/(\omega_o + \Delta\omega)C\ n_4/(\omega_o + \Delta\omega)C = 0$
$(\omega_o + \Delta\omega)^2 = 1/L_Q\ [1/C_Q + n_1 + n_2 + n_3 + n_4/C]$
$= 1/L_Q C_Q[1 + C_Q/C(n_1 + n_2 + n_3 + n_4)]$
$= \omega_o^2\ [1 + C_Q/C(n_1 + n_2 + n_3 + n_4)]$
$\omega_o^2 + \Delta\omega^2 + 2\omega_o\Delta\omega/\omega_o^2 = 1 + C_Q/C(n_1 + n_2 + n_3 + n_4)$
$1 + \Delta\omega^2/\omega_o^2 + 2\Delta\omega/\omega_o = 1 + C_Q/C(n_1 + n_2 + n_3 + n_4)$ where $\Delta\omega^2/\omega_o^2$ is a negligible quantity, so as to provide the final equation $\Delta\omega/\omega_o = \Delta f/f = C_Q/2C\ (n_1 + n_2 + n_3 + n_4)$.

Evidently, the frequency variation obtained is a constant multiplied by the sum of the factors $n$ of the capacitances which are not short-circuited.

Allowing these n factors to equal, for example, 1, 2, 4 and 8, respectively, in the circuit of FIG. 1, and assuming $$C_Q/2C = \Delta f_o/f$$

where $C$ is the total capacity of the variable capacitor 2, the following values may then be obtained:

| $C/n_1$ | $C/n_2$ | $C/n_3$ | $C/n_4$ | $\Delta f/f$ |
|---|---|---|---|---|
| * | * | * | * | 0 |
|   | * | * | * | $\Delta f_o/f$ |
|   |   | * | * | $2\ (\Delta f_o/f)$ |
|   |   |   | * | $3\ (\Delta f_o/f)$ |
| * | * |   | * | $4\ (\Delta f_o/f)$ |
|   |   |   |   | etc. |

* being the short-circuited capacitances.

In the present instance, this would provide sixteen combinations and 16 equi-incremental frequency steps, which increments may be increased by a corresponding increase in the number of capacitances.

Thus, in effect, 32 increment steps would be obtained with five capacitances, 64 increment steps with six capacitances, and so forth.

Selecting, for example, $\Delta f_o/f = 2 \times 10^{-6}$ and utilizing five capacitances this provides for a control range equal to $6.4 \times 10^{-5}$, which readily provides for sufficient adjustment of the frequency.

It is noted that when all the capacitances are short-circuited, the capacitance of the variable capacitor 2 is infinity.

Referring now to the specific embodiment of FIG. 2, an assembly of four thin-layer ceramic capacitors $C/n_1$, $C/n_2$, $C/n_3$ and $C/n_4$ is provided, each of which is brazed onto the printed circuit of a quartz-crystal clock. The capacitors are connected to conductors 7, 8, 9, 10 and 11, which are arranged so that those conductors connected to the two poles of each of the capacitors, have portions which face each other.

Small flexible rotating blades 12, 13, 14 and 15 are placed between each of the facing portions of adjacent conductors and are adapted to provide an electrical connection therebetween, thereby short-circuiting the corresponding capacitor.

As illustrated in FIG. 2, the capacitors $C/n_1$, $C/n_3$ and $C/n_4$ are each short-circuited, whereas the capacitor $c/n_2$ is not. This is obtained by simple rotation of the baldes 12, 14 and 15 into connection between, respectively, conductors 7-8, 9-10 and 10-11; while blade 13 is rotated to prevent connection between conductors 8-9.

Other arrangements in lieu of the blades may be such as, for example, positioning fitting screws between the conductors 7, 8, 9 and 10 where, upon rotation or threading of the screws, the screw heads connect two adjacent conductors.

In the above:

$$\omega_o = 2\pi f_o$$

$f_o$ = resonant frequency of quartz crystal $f$ = range of frequency adjustment.

While there has been shown what is considered to be the preferred embodiment of the invention, it will be obvious that modifications may be made which come within the scope of the disclosure of the specification.

I claim:

1. In a quartz-crystal clock including a quartz-crystal oscillator and an electrical supply circuit connected to said oscillator, a variable capacitor for adjusting the frequency of the quartz-crystal oscillator, said variable capacitor comprising a plurality of capacitors connected in series and positioned in the electrical supply circuit of said oscillator, said capacitors having values which are respectively equal to $C/n_1$, $C/n_2$, ... $C/n_x$, where $n_1$, $n_2$, ... $n_x$ are integers, means adapted to short-circuit each said capacitor independently of the remainder of said capacitors so as to provide quartz oscillation frequency variations which are substantially multiples of a value $\Delta f$, said last-mentioned value being equivalent to the frequency variation obtained by positioning a predetermined capacitance C into said electrical supply circuit and $f$ being equal to the range of frequency adjustment.

2. A capacitor as claimed in claim 1, wherein said supply circuit includes a printed circuit, said capacitors comprising thin-layered capacitors brazed on to said printed circuit, said capacitors including connecting poles, conductive elements connected to said poles and having portions facing each other, said short-circuit means including a movable connector adapted to be positioned to place said facing portions into conductive relationship so as to selectively short-circuit respective of said capacitors.

3. A capacitor as claimed in claim 2, wherein said movable connector members comprise rotatable flexible blades.

4. A capacitor as claimed in claim 2, wherein said movable connector members comprise screws.

5. A capacitor as claimed in claim 1 wherein each of the capacitors of said plurality of capacitors is of fixed capacitance.

* * * * *